Oct. 22, 1968  J. H. LEPP ET AL  3,406,914
MATERIAL UNLOADER
Filed Oct. 7, 1966
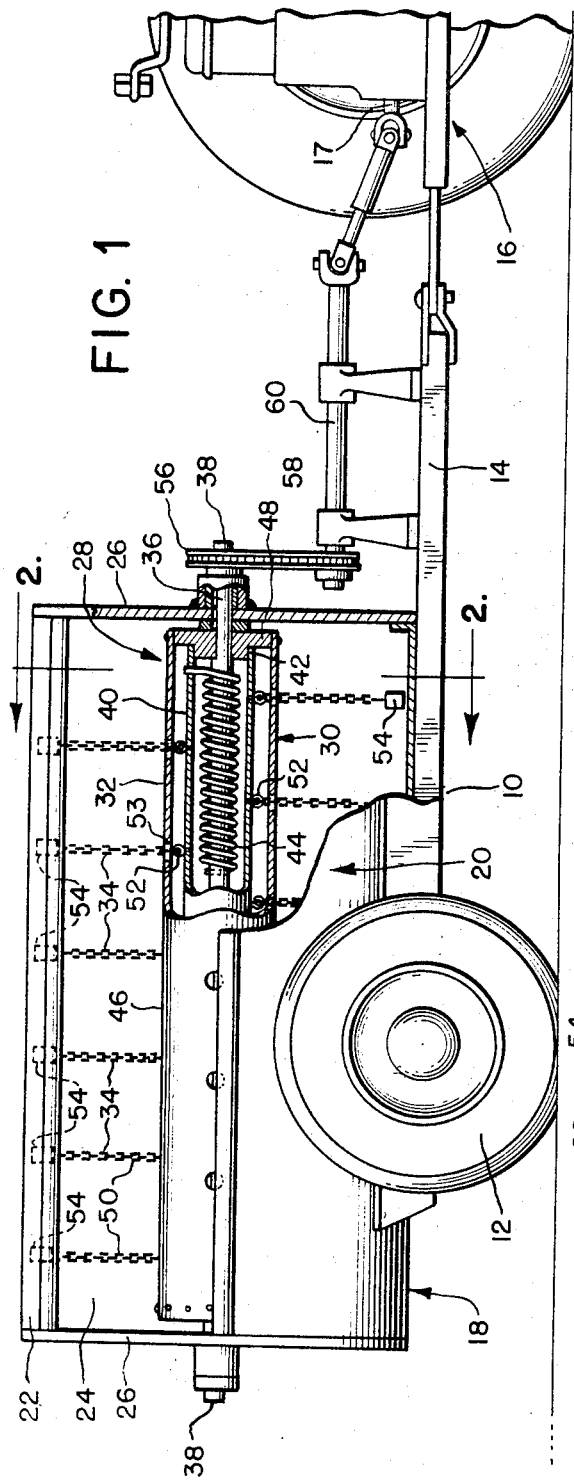
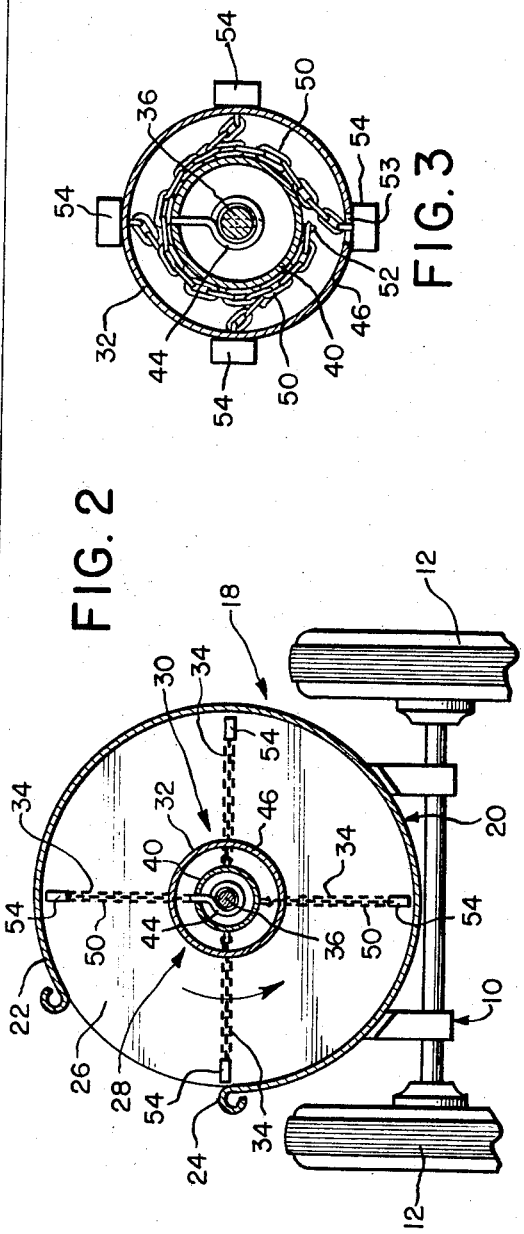
Inventors
Jacob H. Lepp
Roy Ayranto
Attorney

United States Patent Office 3,406,914
Patented Oct. 22, 1968

3,406,914
MATERIAL UNLOADER
Jacob H. Lepp and Roy Ayranto, Grimsby, Ontario, Canada, assignors to International Harvester Company, Chicago, Ill., a corporation of Delaware
Filed Oct. 7, 1966, Ser. No. 585,123
1 Claim. (Cl. 239—658)

ABSTRACT OF THE DISCLOSURE

A material unloader including a wheel-mounted tank-like container for fertilizers. Longitudinally disposed shaft means mount a plurality of flexible flails operative upon rotation of the shaft means for throwing the fertilizer from the container. A spring assembly is associated with the shaft means and the flails for normally holding the flails in a retracted and enclosed position so that the flails are progressively thrown outwardly by centrifugal force as the load of fertilizer is depleted.

---

The present invention relates to a material unloader.

The material unloader or implement of the present invention is of the type including a container and a heater extending generally over the entire area of the container and operative upon rotation thereof for throwing the material from the container and spreading it on the ground, eliminating the relatively expensive construction formerly used which included, for example, a conveyor for carrying the material in the container to the beater at one end of the container.

The implement is also generally known as a manure spreader, and may be used for spreading various kinds of materials including commercial fertilizers, both solid and liquid.

A broad object of the invention is to provide a material unloader of the foregoing character wherein the beater includes radial material engaging elements, such as arms or flails which extend in radial length progressively as the load of material is depleted so that they engage or dig into the material at a substantially constant depth throughout the entire unloading operation.

A more specific object is to provide a material unloader of the character just referred to in which the radial elements or flails are normally biased inwardly to a retracted position and are projected or thrown outwardly by centrifugal force, progressively as the load of material is depleted.

A still further object is to provide a material unloader of the foregoing character in which when the arms or flails are in retracted position they are substantially enclosed and shielded from the material in the container.

Other objects and advantages of the invention will appear from the following detail description taken in conjunction with the accompanying drawings in which:

FIGURE 1 is a side view of a material unloader made according to the present invention;

FIGURE 2 is an end view of the unloader; and

FIGURE 3 is a view taken atl ine 3—3 of FIGURE 1.

Referring now in detail to the accompanying drawings, the material unloader or implement, or manure spreader, of the present invention is shown in its entirety in FIGURES 1 and 2 and includes a chassis 10 having wheels 12 and provided with a tongue 14 for connection with a prime mover such as a tractor 16 having the usual power takeoff shaft 17.

The implement also includes a container 18 which may also be designated a box, and since it may also be utilized for liquids, may also be designated a tank. The container 20 is generally cylindrical in shape having a bottom portion 20 substantially semi-cylindrical in extent adapted for receiving the material to be unloaded. The container extends over the top at 22 forming a cover portion, but less than a semi-cylinder in extent, forming an opening 24 through which the material is thrown for spreading on the ground. The container also includes end wall elements 26.

Mounted in the container is a beater 28 rotatable on a longitudinal axis indicated at 30, the opening 24 being directed laterally relative to this axis. The beater 28 includes a body or core 32 and a plurality of arms or flails 34. The body or core includes a center shaft 36 by which the beater is mounted, having end portions 38 extending through the end wall elements 26 and serving as the means for journalling the shaft. Rotatably mounted on the center shaft 36 is a tubular shaft 40, having suitable bearings 42, and interconnecting the center shaft 36 and the tubular shaft 40 is a torsion spring 44 for the purpose to be referred to again hereinbelow. The tubular shaft 40 is enclosed in an outer tubular casing 46 rigidly and unitarily mounted on and connected with the center shaft 36 as by means of annular plates 48 for rotation therewith, whereby the tubular shaft 40 is enabled to rotate a limited extent relative to the outer casing 46.

The flails 34 include chains 50 connected to the tubular shaft 40 as by means of lugs 52 and extend through apertures 53 in the casing 46 and at their outer end are provided with drags 54 which serve as the elements which directly engage the material in the container in the operation of unloading the material.

On the outer end of the extension 38 of the center shaft 36, at the front end of the implement, is a pulley or sprocket 56 over which is trained a belt or chain 58 driven by a drive shaft 60 which in turn is driven by the power takeoff shaft 17 of the tractor.

In a starting condition, with the beater 28 stationary, the torsion spring 44 reacting between the center shaft 36 and tubular shaft 40 produced relative rotation therebetween such as to retract the flails 50 through the apertures 53 to a retracted position represented in FIGURE 3 in which the chains of the flails are wrapped around the tubular shaft 46, until the drags 54 engage the casing 46, limiting the retracting movement of the chains and thus limiting the relative rotational movement of the tubular shaft 40. In such condition or position, the bottom portion of the container 20 is relatively free of the various elements of the beater and capable of receiving a maximum load of material to be unloaded. Upon beginning unloading operation, the beater is rotated and due to centrifugal force, the arms or flails 34 are thrown out or projected radially so as to bring the drags 54 thereof into engagement with the material in the container. These drags then dig into the material and throw it from the container through the opening 24 and spread it on the ground. As the operation continues and the load of material lowers, the arms or flails 34 are progressively projected by centrifugal force so that they are projected or extended progressively in proportion to the lowering of the level of the material with the consequence that the drags 54 enter into or dig into the material an extent substantially constant or uniform throughout the unloading operation regardless of the level of the material. The arms or flails 34 may be of any suitable length such as, for example, to approach but be spaced from the surface of the container, or if desired they may actually engage and drag on that surface, the flexibility of the chains enabling the desired yielding effect.

When the beater is stationary, the chains 50 are entirely encased in the outer casing 46, being wrapped around the inner tubular shaft 40.

While in the preferred arrangement, the material is thrown to the side, but it is possible to throw it in other directions, including directly rearwardly.

While we have herein disclosed a certain preferred form of the invention, it will be understood that changes may be made therein within the spirit and scope of the appended claim.

We claim:

1. A material unloader comprising a wheeled chassis, a container on the chassis, a beater rotatably mounted in the container having flexible radial elements extensible in response to centrifugal force, and means yieldably retracting the radial elements, the container having an opening directed laterally relative to the axis of rotation of the beater, the beater including a body having a central shaft extending beyond the container in forward direction for connection with driving means, and including a tubular shaft surrounding the central shaft and having limited rotational movement relative thereto, an outer casing surrounding the tubular shaft and fixed with the central shaft, the retracting means including a torsion spring surrounding the central shaft and secured thereto at one end and secured to the surrounding tubular shaft at its other end, the flexible radial elements including chains secured to the tubular shaft and extending through apertures in the outer casing with drags on their outer ends, the radial elements being of sufficient length that when in their fully radially extended position the drags thereof are closely adjacent the cylindrical surface of the container, the drags engaging in the outer casing upon full contraction of the radial elements and the outer casing thereby serving as means limiting the retracting movement of the radial elements.

References Cited

UNITED STATES PATENTS

| | | | |
|---|---|---|---|
| 3,161,412 | 12/1964 | Ferris | 239—658 |
| 3,165,322 | 1/1965 | Ferris | 239—658 |
| 3,167,318 | 1/1965 | Ferris | 239—658 |

ALBERT J. MAKAY, *Primary Examiner.*